(12) United States Patent
Ciszkowski et al.

(10) Patent No.: US 9,818,124 B2
(45) Date of Patent: Nov. 14, 2017

(54) METHODS FOR SALES CALL DATA MANAGEMENT AND PROCESSING

(75) Inventors: Mietek Ciszkowski, Milford, CT (US); Sayee Natarajan, Norwalk, CT (US); Rajeshwara Raghavan, Norwalk, CT (US); Jake Stahl, Milford, CT (US)

(73) Assignee: Purdue Pharma L.P., Stamford, CT (US)

( * ) Notice: Subject to any disclaimer, the term of this patent is extended or adjusted under 35 U.S.C. 154(b) by 1766 days.

(21) Appl. No.: 11/925,552

(22) Filed: Oct. 26, 2007

(65) Prior Publication Data

US 2008/0103856 A1 May 1, 2008

Related U.S. Application Data

(60) Provisional application No. 60/863,243, filed on Oct. 27, 2006, provisional application No. 60/867,902, filed on Nov. 30, 2006.

(51) Int. Cl.
*G06Q 30/02* (2012.01)
*G06Q 10/06* (2012.01)

(52) U.S. Cl.
CPC ......... *G06Q 30/02* (2013.01); *G06Q 10/0639* (2013.01); *G06Q 10/06398* (2013.01); *G06Q 30/0201* (2013.01)

(58) Field of Classification Search
CPC ............... G06Q 30/02; G06Q 30/0201; G06Q 10/0639; G06Q 10/06398
See application file for complete search history.

(56) References Cited

U.S. PATENT DOCUMENTS

| | | | |
|---|---|---|---|
| 6,708,156 B1 * | 3/2004 | Gonten | 705/7.31 |
| 7,181,413 B2 * | 2/2007 | Hadden | G09B 7/00 434/107 |
| 7,216,087 B2 * | 5/2007 | Thompson et al. | 705/10 |
| 7,519,589 B2 * | 4/2009 | Charnock et al. | |
| 7,542,917 B2 * | 6/2009 | Tsai | 705/10 |
| 7,610,549 B2 * | 10/2009 | Vignet | 715/227 |

(Continued)

FOREIGN PATENT DOCUMENTS

WO WO-2004036464 4/2004

OTHER PUBLICATIONS

U.S. Appl. No. 11/925,512, Aleksiejczyk, et al.

(Continued)

*Primary Examiner* — Asfand Sheikh
(74) *Attorney, Agent, or Firm* — Leason Ellis LLP

(57) ABSTRACT

Sales Tool and methodology for field representatives of products or services records the dates of site visits with customers, acquires sales data concerning consumption of a product or service in a region which is attributable to the customer, generates a chart that depicts the acquired sales data and superimposes on the chart the site visit information so as to coordinate sales data and site visit information into a unified presentation to the representative. Software implementations can permit the representative to interact with the superimposed site visit information and cause additional information to be retrieved from the local database or elsewhere and be presented. Site visits can include other points-of-contact between the customer and the representative, his or her company, or his or her company's materials.

20 Claims, 5 Drawing Sheets

(56) References Cited

U.S. PATENT DOCUMENTS

| | | | |
|---|---|---|---|
| 7,708,202 B2* | 5/2010 | Hawkins | 235/385 |
| 7,826,966 B2* | 11/2010 | Little | G06F 17/30041 |
| | | | 455/414.1 |
| 7,831,465 B2* | 11/2010 | Hoff | 705/7.31 |
| 8,055,551 B2* | 11/2011 | Milgramm et al. | 705/26.1 |
| 2003/0050825 A1* | 3/2003 | Gallivan et al. | 705/10 |
| 2006/0059035 A1* | 3/2006 | Kraft | G06Q 30/0641 |
| | | | 705/345 |
| 2006/0116918 A1* | 6/2006 | Flora | G06Q 10/06311 |
| | | | 705/7.19 |
| 2006/0224395 A1* | 10/2006 | Miyadai | 705/1 |
| 2006/0282432 A1* | 12/2006 | Cassidy et al. | 707/7 |
| 2008/0103856 A1* | 5/2008 | Ciszkowski et al. | 705/7 |
| 2008/0288889 A1* | 11/2008 | Hunt | G06Q 30/02 |
| | | | 715/810 |

OTHER PUBLICATIONS

U.S. Appl. No. 11/925,565, Aleksiejczyk et al.
U.S. Appl. No. 11/925,405, Cerbone et al.
U.S. Appl. No. 11/925,403, Ciszkowski et al.
U.S. Appl. No. 11/925,491, Arora et al.

* cited by examiner

METHODS FOR SALES CALL DATA MANAGEMENT AND PROCESSING

This patent application claims the benefit of priority under 35 U.S.C. §119(e) of U.S. Provisional Application Ser. No. 60/867,902, filed Nov. 30, 2006, entitled "Methods for Sales Call Data Management And Processing," and of U.S. Provisional Application Ser. No. 60/863,243, filed Oct. 27, 2006, entitled "Territory Management System," which are hereby incorporated by reference in their entireties.

FIELD OF THE INVENTION

The present invention relates to the tools for managing information relating to the activities of field representatives of manufacturers and service providers, and, more particularly, to software, systems and methodologies that assist in the management and processing of sales call data.

BACKGROUND OF THE INVENTION

In many sectors, field representatives are used to educate customers and potential customers on the products of manufacturers and service providers. In the course of their duties, sales representatives make site visits and build a relationship with the customers and potential customers in their assigned territory. Typically, field representatives maintain records of their visits in accordance with any guidelines or requirements of the companies that they represent. The records of site visits can include details and have formats that vary widely among representatives and the companies they represent.

While there are many reasons for site visits, typically one of them is a commercial purpose relating to a product or service. It is difficult, however, to arrive at a meaningful determination as to the effectiveness of a given representative's activities in a territory.

On the one hand, there are companies that collect information relating to the consumption of products and services in a number of industries. Sales information is available commercially from such companies, and, depending on the industry, may be purchased by the market participants to gauge the progress of their products and services. One use of this information is for competitive awareness. For instance, in a variety of sectors, it can be of interest to manufacturers to gauge the relative performance of their offerings to those of other companies in the same product category. A non-limiting list of examples of sectors that can have this interest includes the pharmaceutical, personal care, medical device, toy, consumer electronics, office equipment, and construction equipment sectors. Another use of this information can be to track interest in a product or service that has been marketed or made available for purchase in a particular geographic area.

On the other hand, even if such information is available, it is not readily available to or usable by a field representative to gauge the effectiveness of the message he or she is trying to convey.

PCT WO 04036464 describes a system in which product sales data are utilized in conjunction with sales activity data to provide reports that can be used to analyze where changes in sales effort may be needed. That system provides information suitable for identifying potential changes in the sales efforts of an entire sales force, upon analyzing the number of sales calls made within a given time period.

What remains needed, however, are tools that can suggest changes in the sales efforts by a particular representative within a sales force, in which specific dates or timing of sales call events are coordinated with product sales data. The present invention addresses this deficiency in the art and provides other improvements useful to field representatives.

SUMMARY OF THE INVENTION

In accordance with one aspect of the invention, a method is provided that is useful in assisting a representative in gauging the effectiveness of his or her message delivery to a customer. According to this method, the representative records the date of one or more site visits with the customer into a local database that he or she uses. Sales data concerning consumption of a product or service in a region which is attributable to the customer is downloaded. A chart is generated that depicts the acquired sales data. Superimposed on the chart is site visit information which coordinates sales data and site visit information into a unified presentation to the representative.

In accordance with an optional further aspect of the invention, the representative can interact with the superimposed site visit information and cause additional information to be retrieved from at least the local database, and optionally from other sources, and be presented on a display. Optionally, configuration settings can be established which define the additional information to be presented to the representative.

In accordance with another optional aspect of the invention, the downloading of sales data is selective, and is based on parsed sales data that is associated with one or more customers assigned to the representative, or a region associated with the representative.

These and other aspects, features, and advantages will be apparent from the following description of certain embodiments and the accompanying drawing figures.

DESCRIPTION OF THE DRAWING FIGURES

Figure 5:
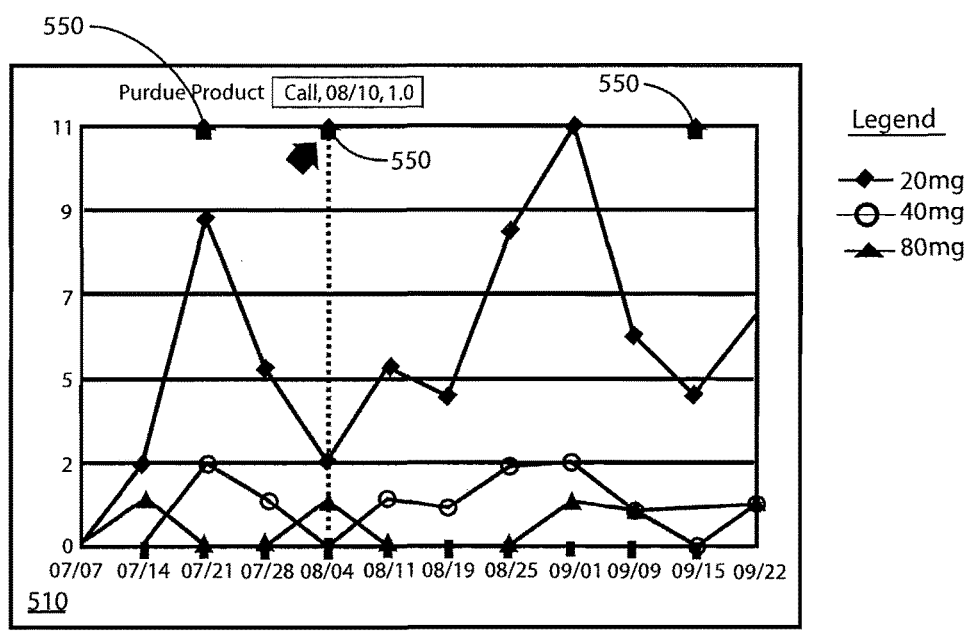
Figure 4:
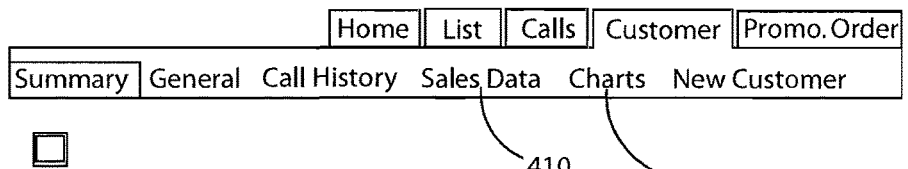

FIG. 4 is a sample output mechanism for presenting to the sales representative a summary of information concerning a particular customer in the sales representative's territory; and FIG. 5 is a sample output form in accordance with the preferred embodiment in which actual prescription fulfillment by a prescriber in the sales representative's territory is coordinated with completed call dates to that prescriber.

DETAILED DESCRIPTION OF CERTAIN EMBODIMENTS

By way of overview and introduction, a territory management system provides representatives with a tool for conducting their activities in an efficient manner, and in relevant part includes functionality adapted to assist a field representative in delivering effective messages to reinforce their customer's interest in a product or service.

The management system is preferably implemented as a software-based system, having components executing on a number of systems including a central computer and a multiplicity of remote machines, with each representative having a remote machine for his or her personal use. Without loss of generality, the present invention is described in relation to a particular representative using a single remote machine in the course of his or her activities covering an assigned territory. In the preferred embodiment described below, the representative is bespoke or contracted to a pharmaceutical manufacturer, and the representative "covers" a territory through visits to health care providers ("HCPs"), physicians, pharmacists, nurses and medical assistants (collectively, more generally, "prescribers") at which the representative is able to discuss and promote the use of the manufacturer's products. However, the invention has industrial applicability in other sectors including in connection with field representative activities in promoting products and services of general nature, including, without limitation, in the medical device sector and in other sectors, as mentioned above.

A preferred software tool for territory management is described, in part, in the aforesaid U.S. Provisional Application Ser. No. 60/863,243, entitled "Territory Management System." The Territory Management System software provides through a Web-browser interface a number of tools that assist the representative in planning, recording, and tracking activities with customers such as prescribers. In relevant part, the Territory Management System software can assist a representative with managing, processing and deciphering sales information following their efforts in servicing his or her assigned territory. The Territory Management System software includes additional features that can assist representatives in other ways, such as in complying with certain regulatory requirements or state or federal constraints concerning expenses in connection with visiting health care professionals, in reducing discrepancies in sample inventories as between stored and on-hand inventories, and in scheduling site visits to HCPs. Various features of the Territory Management System software are described in certain co-pending provisional patent applications which are referenced below, to the extent they have pertinence to the discussion of the present invention.

The remote machine used by the representative includes a suitable complement of hardware and software including, by way of example, a processor, memory, an accessible database, communications equipment, and input/output devices.

Figure 1A:
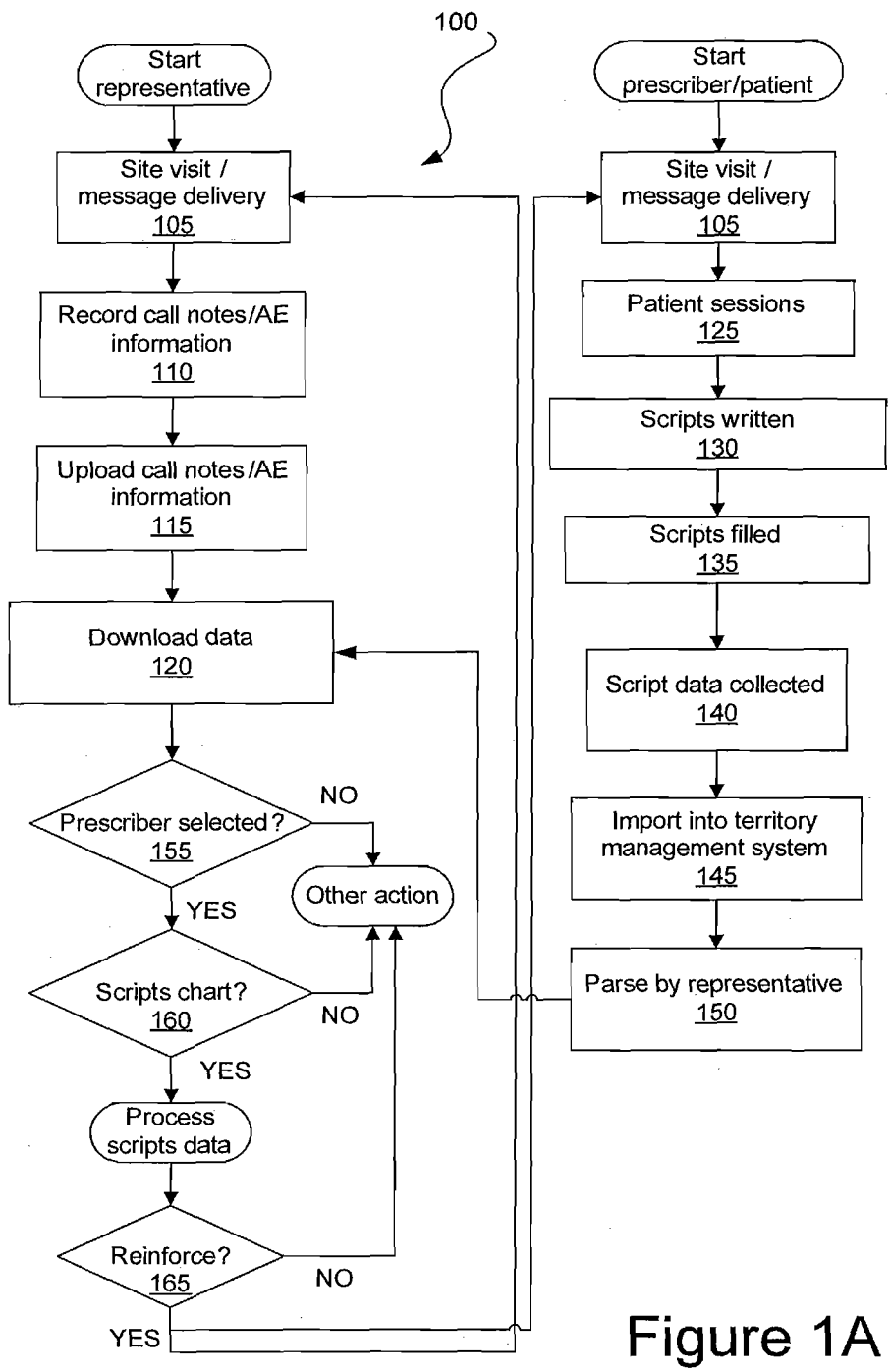
FIG. 1A is a flow diagram illustrating certain steps in accordance with a preferred embodiment of the invention in which sales information concerning prescription medications is managed and coordinated with recorded activities of a sales representative within a territory management software application.

Referring now to FIG. 1A, a flow diagram illustrates functionality suitable for capturing certain sales information that may be attributable to a representative's activities in making sales calls to customers in his or her territory. In particular, within a period of time after a given visit by the sales representative, customers may increase, decrease or continue "actions" that result in sales of the product or service that the sales representative represents. In many cases, the sales representative makes calls to the actual customer, and the actions that can be tracked are the purchases by that customer of the goods or services being represented by the sales representative. In certain cases, such as with regard to field representatives for pharmaceuticals, the sales representative makes calls upon the prescriber who is an intermediary of sorts, in that the prescriber does not purchase the medication, but rather facilitates such purchase by his or her patients in writing prescriptions that are later filled at pharmacies and the like. In any case, however, the captured sales information concerns the purchase or consumption of a represented product or service. The process 100 includes activities by both a sales representative (illustrated in the left branch of the flow diagram) and a prescriber and his or her patient (shown in the right branch). The activities of these persons, and data capture described below are brought together, in accordance with a salient aspect of the invention, to assist a field representative in gauging the effectiveness of the message he or she is trying to convey, specifically, through interactive and graphical components that are rendered on a display of his or her programmed machine.

The process 100 illustrated in FIG. 1A concerns activities relating to a pharmaceuticals representative. In the area of pharmaceutical representation, it is common for a representative to drop-in on a prescriber within the representative's assigned territory with the hope that the prescriber will be able to speak with the representative for a few minutes. The nature of such visits can vary from informal to formal, but one objective of the representative is to promote a prescriber's familiarity and understanding of pharmaceuticals that the representative wishes the prescriber to prescribe to patients. In other fields, the representative similarly has an objective of promoting purchase and use of his or her represented products and services through educational and promotional efforts.

Thus, at block 105 (left and right branches), the representative makes a site visit to a particular prescriber's office. The representative typically makes a number of visits during the course of a day, whether scheduled or drop-in, and these visits can be coordinated through a calendar function provided by the same programmed system that handles the representative's reporting of any expense information. The scheduling and calendar functions form no part of the present invention, but are described in co-pending U.S. Provisional Application Ser. No. 60/868,015, filed on Nov. 30, 2006, entitled "Cycle Planning Tool for Territory Management" and U.S. Provisional Application Ser. No. 60/868,027, filed on Nov. 30, 2006, entitled "Itinerary Search Tool for Territory Management," which are each hereby incorporated by reference in their respective entireties.

It may be that the prescriber is not available for a conference with the representative, in which case the representative proceeds to a next appointment by traveling to another site within his or her territory, preferably with guidance from a calendared set of appointments that fill the day. If, however, a conference is held with a prescriber at a particular site visit, then the representative is supposed to capture a summary of who was met, what products (services) were discussed, whether samples were provided (and details concerning same), whether any adverse event information was discussed, propose a next meeting and follow-up discussion points, and document any expenses attributable to any prescribers that were visited. This information is captured in a "call note," which, upon entry into his or her machine, is a "call completion" concerning a sales call made at a given date and time. Functionality, systems and methodologies suited to sample inventory management are described in co-pending U.S. Provisional Application Ser. No. 60/867,903, filed on Nov. 30, 2006, entitled "Inventory Control over Pharmaceutical Sample Distributions, Software, Systems and Methodologies," which is hereby incorporated by reference in its entirety. Functionality, systems and methodologies suited to adverse-event data capture, management and reporting are described in co-pending U.S. Provisional Application Ser. No. 60/867,923, filed on Nov. 30, 2006, entitled "Adverse Event Data Capture Software, Systems, And Methodologies" ("AE Capture"), which is hereby incorporated by reference in its entirety. Functionality, systems and methodologies suited to expense capture are described in co-pending U.S. Provisional Application Ser. No. 60/867,906, filed Nov. 30, 2006, entitled "Pharmaceutical Representative Expense Report Management Software, Systems, And Methodologies," which is hereby incorporated by reference in its entirety.

Representatives generally seek to satisfy any concerns expressed by the customers in their territory, and so follow-up points can be captured in the territory management software so that the representative can better address those concerns with their customers. Representatives also have obligations to the company they represent to document any expenses attributable to visits to their customers and any adverse events that may have been reported for investigation or follow-up. Equally important, however, is a need for a representative to have a reference based on some sort of market feedback on which to gauge whether the message he or she intended to deliver was effective or ineffective. Market feedback can relate to prescriptions written by a prescriber or any other type of sale by the customer or persons in contact with the customer of the representative.

Use of the territory management system commences then at block 110 at which the representative initiates the entry of visitation notes, known as making a "call completion" because he or she has completed a sales call to the prescriber/customer and has meeting notes to record. The user can initiate this data entry process in a variety of ways. For example, a calendar feature of the management system can present an icon such as a telephone icon for selection which causes a call-notes entry form to be displayed. Alternatively, the calendar feature of the management system can include entries showing the time, location, or both, of the visits for that day which the representative can select to bring up the call-notes entry form. Yet another alternative is that the representative can call up a prescriber summary page (FIG. 4) which can include a link (or an icon as mentioned above) to enter call notes that are to be associated with that prescriber visit.

At block 110, the user inputs call notes and any adverse information using a suitable data entry form, such as the call-notes entry form described in the aforementioned AE Capture disclosure, which is recorded into the local database on the user's machine. The completed call notes and any adverse-event information are uploaded to the central computer over a suitable communication link, at block 115. During that same communication or in a separate communication session, the central computer can download to the user's machine information that is designated for receipt by the representative, including, in relevant part, any sales data that has been imported or otherwise provided to the territory management system software, as indicated at block 120. The data exchange is over a communication link between the central computer and the remote machine of the representative. In the event that the representative's machine includes wireless network capabilities (e.g., a broadband card that can connect the machine through a "hot spot"), the upload at block 115 (and optionally the download at block 120) can occur whenever the system detects that it has secure network connectivity, and this process can be performed as a background thread while the user performs other tasks on the machine running the territory management software. The data exchange can be conducted in accordance with co-pending U.S. Provisional Application Ser. No. 60/867,943, filed on Nov. 30, 2006, entitled "Data Cache Techniques In Support Of Synchronization of Databases In A Distributed Environment," which is hereby incorporated by reference in its entirety.

Referring now to the right branch of FIG. 1A, the same site visit at block 105 is generally followed by sessions with one or more patients, as indicated at block 125. In the course of meeting with patients and considering their health, the health care professional may, in his or her sole judgment determine that a particular medication would be of benefit to the patient. In the event of that determination, a prescriber writes a prescription, as indicated at block 130, which is no different than the conventional interaction of doctor and patient. However, in accordance with a salient aspect of the present invention, any fulfillment of those prescriptions is gathered and coordinated with sales calls by the representative, using the territory management software, as described next.

In particular, having been given a prescription to fill, patients bring the prescription to a pharmacy or the like for filling and sometimes refilling. As indicated at block 135, the prescriptions are filled in a conventional manner. In filling or refilling a prescription, the pharmacist enters certain information into his pharmacy system regarding the prescription medication such as the patient's name, the prescriber's name or medical group, the name of the drug, its dosage, the frequency that it is to be taken, whether refills are permitted, and the like. Optionally, the pharmacist may input whether there is any restriction on filling the prescription with a pharmaceutically equivalent alternative to the drug specified by the prescriber.

The information input into the pharmacy system is made available to third parties, such as Verispan, IMS and NDC Health, directly through contracts with pharmacies or indirectly from American Medical Association ("AMA") masterfiles, which are licensed to such companies for matching with the prescription data they already have on file. As indicated at block 140, prescription data is collected by third-parties such as the ones noted above can be used to produce drug distribution and prescription pattern reports by zip code, physician drug enforcement agency ("DEA") number, or other categories. These reports are HIPAA compliant and de-identified, meaning that no patient names are included in the data, though physicians in some cases can opt out of having their prescribing patterns made available, such as pursuant to the AMA's Prescribing Data Restriction Program (PDRP) implemented on Jul. 1, 2006. In any event, these companies are vendors of such reports to various types of health industry organizations, including pharmaceutical manufacturers.

At block 145, the third-party sales information concerning prescriptions written by various prescribers is imported into the territory management software system. As a result of block 145, the data from the third-parties is received in an electronic form that permits it to be processed by the central computer. For example, reports can be generated regarding doctor prescribing patterns, doctors within a given representative's territory, overall drug market category, and the like to generate profiles and details as to the drug classes favored by a doctor, and which doctors are comparatively high-prescribers of either their own or a competitor's drug products.

At block 150, the sales information is parsed or otherwise arranged so as to identify the data concerning prescribers associated with each particular representative. The sales information, so organized or arranged, can be included in the data download at block 120 to the remote machine of the representative. Typically, the information that can be downloaded to the representative's machine can include any portion or all of the information from the sales report.

Referring again to block 120, a download is made to the remote machine after establishing a communication link between the remote machine and the central computer. In relevant part, the download updates the database on the remote machine of the representative with the sales information that has been imported into the territory management system from one or more third-party sources. While these reports contain a great volume of information, only that portion which is relevant to the HCPs or other customers in the representative's assigned territory are downloaded to the representative's machine. The download can also include information sufficient to revise the scope of the representative's territory, to add new prescribers, and to change the user's role (e.g., from representative to district manager). Such downloads are preferably conducted in accordance with co-pending application Ser. No. 60/867,945, filed on Nov. 30, 2006, entitled "Software, Systems and Methodologies For Realignment of Remote Databases By A Central Database In Support of Field Representative Territory Assignments," which is hereby incorporated by reference in its entirety.

At a time during or after the download of data, the representative may wish to review details or summaries concerning prescribers in his or her territory. In this regard, a prescriber may be selected by interacting with various tabs, buttons, or other controls provided through the territory management system user interface, which permits the representative to select a prescriber.

Figure 3:
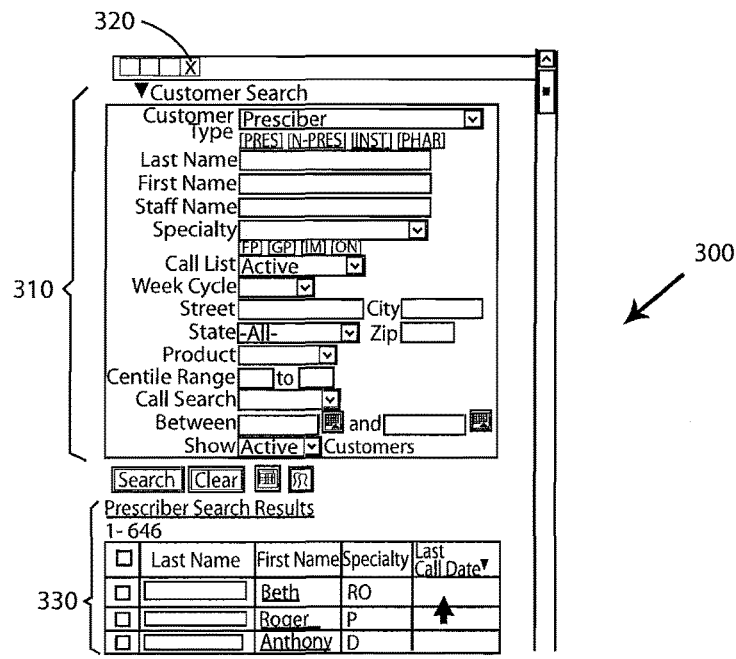
FIG. 3 is a sample search form which is suitable for identifying customers such as health care professionals from among those assigned to a representative's territory, with the search results being available for selection and use by the representative.

For example, the representative can enter search criteria in a customer search region 310 of a search window, as shown in FIG. 3, which region can be displayed or closed/hidden using user-interface control 320, on any number of screens provided with the user interface. The search region 310 has been configured to retrieve customers of type "prescriber," who are on an "active" call list, regardless of which state they are in. For this particular representative, having a territory assigned to him and a local database which provides information on customers within his or her territory, that search results in 646 prescribers, as indicated in the prescriber search results region 330. The prescribers located by this search are listed and can be viewed by conventional scrolling operations, as understood by those of skill in the programming arts. Any of the search results from the search criteria can be selected to call up further details.

Thus, in the illustration in FIG. 3, a pointer device has been positioned adjacent the search result that corresponds to HCP/customer "Beth." By selecting an entry (e.g., clicking the pointer), as indicated at block 155, a customer summary page 400 can be called onto the screen for that prescriber. As noted above, there can be many ways to navigate the user interface provided in any given implementation; what is relevant to the present discussion is that the representative can, after having downloaded sales data, call up reports on any particular prescriber in his or her territory. If a prescriber is not selected, then the representative is taking some other action (or no action), as indicated in the "NO" branch of the flow diagram.

The customer page 400 can display prescription writing data, or the representative can make a further selection such as by selecting the sales data tab 410 or the charts tab 420. The further selection to display prescription data can be tested at block 160 whenever a further selection is required to call up that information through the user interface. In the event that prescription information is not already processed and displayed, those steps are performed as described below with regard to FIG. 2. If some other action is taken, then the "NO" branch of the flow diagram is followed.

The processing and display of prescription data is made in coordination with site visit information. The benefit of coordinating site visit information with prescription writing or other sales information is that the representative can gauge whether he or she has been effective in delivering a sales message so as to provide the customer/HCP with sufficient information so that the sales are made. If the message is effective, the representative can focus his or her efforts on other customers; however, if the gauge suggests that the message is not getting through so as to positively impact sales, the representative can act on that information by scheduling additional site visits sooner than perhaps otherwise would be done, as indicated by the loop back to block 105.

Figure 1B:
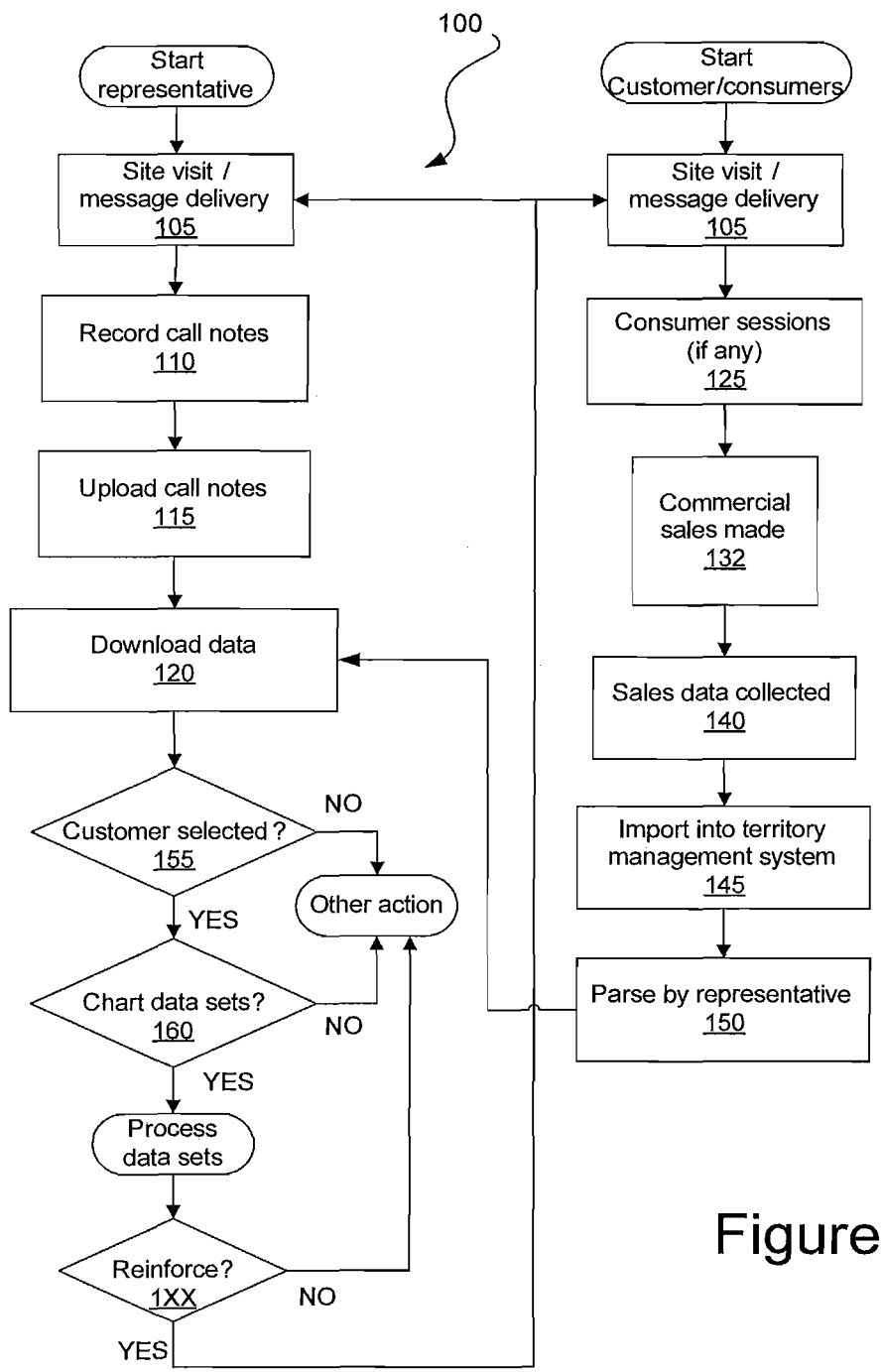
FIG. 1B is the flow diagram of FIG. 1A, now more broadly illustrating steps applied to the management and coordination of sales information in general.

Turning briefly to FIG. 1B, the process flow previously described is explained with reference to sales calls to customers of arbitrary type, in which like reference numbers refer to blocks substantially as described above. In situations in which the customer is not a health care provider, the call notes that are recorded and uploaded may take a different form than are typical in the pharmaceutical industry, but generally follow the same process described above. However, FIG. 1B is provided to illustrate those sectors and industries in which the representative's customer is the actual purchaser. For example, a buyer of a line of goods handled by the representative makes purchases on behalf of a retail store or a chain of stores. The present invention permits the effectiveness of sales messages to be gauged in this direct-purchase-by-customer scenario. The process of FIG. 1A concerns products and services in which the representative travels and makes sales calls to agents who, in turn, suggest the sale to end users/customers. Referring first to the right branch of FIG. 1B, after a site visit to the customer, there may or may not be sessions with end consumers, as indicated at block 125. Sales are made in which products or services represented by the representative are sold into commerce, as indicated at block 132. Third party vendors collect such sales information and make it available for purchase, as indicated at block 140. That information is imported into the territory management system and parsed, as described above at blocks 145 and 150. Returning now to the left branch, sales information is then downloaded at block 120 and available for selection (block 155) and presentation in chart or other form (block 160), coordinated with sales visit information, as described next, to assist the representative in gauging whether his or her message is being delivered effectively.

Figure 2:
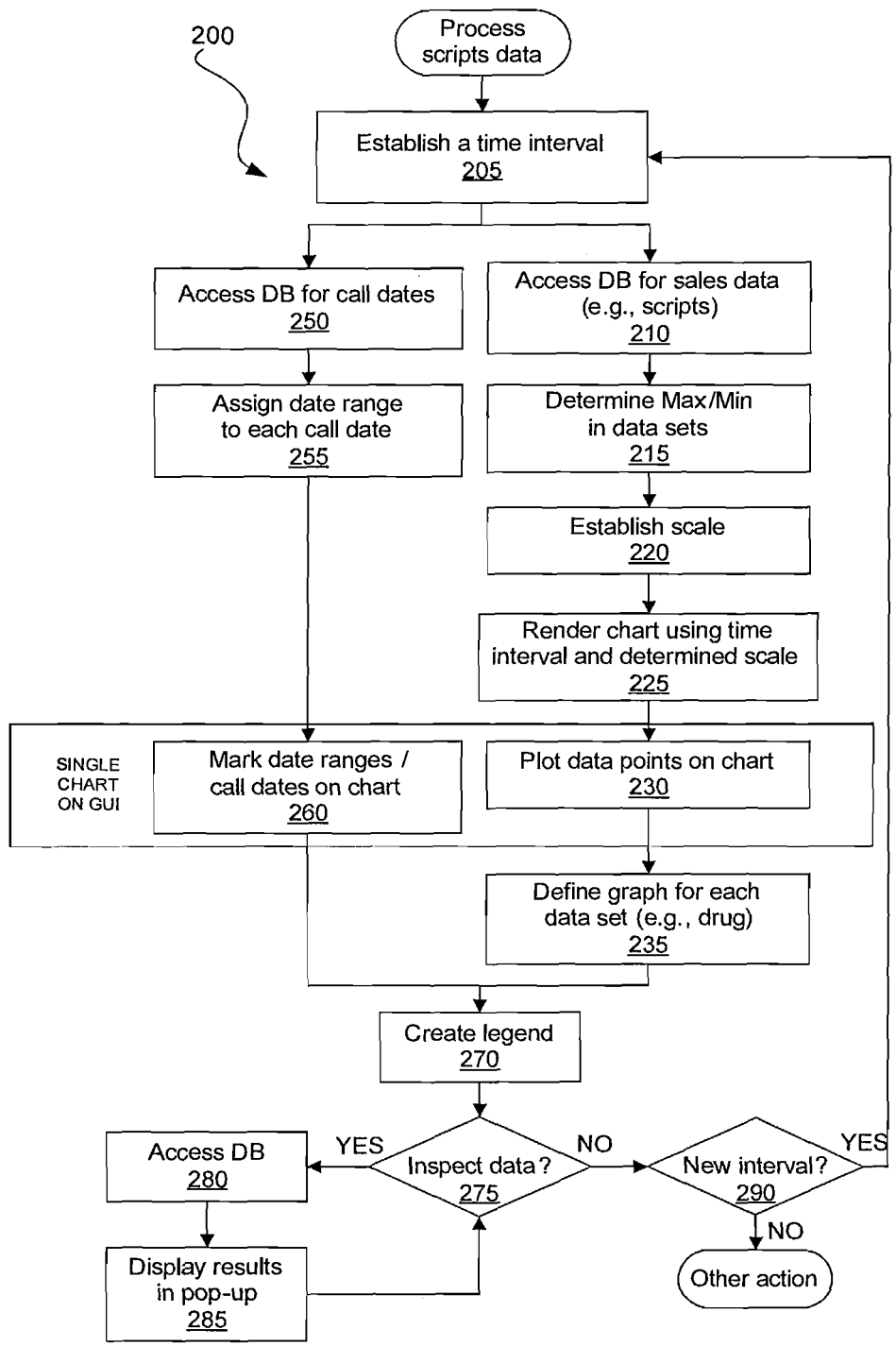
FIG. 2 is a flow diagram illustrating certain steps that can be taken in accordance with an embodiment of the invention in which sales of prescription medications is to be coordinated with completed calls by a sales representative.

Referring now to FIG. 2, a process 200 uses the third party prescription writing data ("scripts" data) and information in the territory management system regarding site visits by the representative to output a coordinated presentation that can assist the representative in gauging the effectiveness of message delivery, in selecting a time for a next visit with that prescriber, and in making other decisions or determinations concerning the prescribers in his or her territory. FIG. 2 is discussed in relation to prescription writing information received from third-party vendors, but applies more generally to any sales data, such as discussed above in connection with FIG. 1B.

The process 200 up until block 270 can be performed as a background process with the results available for presentation in the customer summary page 400. Automated program code can retrieve and process the information from the representative's machine and plot it on the display. The functionality that results in the coordinated output comprises sub-blocks which are described next.

At block 205 a time interval is established for use in the data presentation through the user interface of the territory management software. The time interval setting is used in a database query to retrieve the date of any site visits that are to be included in the data presentation, and is also used to select at least a portion of the third-party vendor sales data. One default value for the start of the interval can be the start date of the current calendar quarter. Another default value for the start of the interval can be the date that is three months prior to the current date. One default value for the end of the interval can be the current date. These dates can be determined with reference to the system clock on the representative's machine.

At block 210, the third-party sales data is retrieved, preferably from a database. This information is preferably stored in tabular form, with products arranged along one table axis and the week that the sales data represents being arranged along another axis. This information is preferably displayed in a weekly prescription data region 430 of the customer summary page 400. A particular product can come in multiple forms (here, different dosages, but in other cases, as single or double packs, for example), but the sales data for each product is imported into the territory management system and provided to the representative in association with a particular prescriber (here, "Beth").

At block 215, the sales data can be analyzed to identify the range of values (numbers of product/service sold) in the data set. In this way, axes in the chart to be rendered can be appropriately scaled. The analysis can be performed on a product-by-product basis or with regard to groups of products. The database query protocol can include native functions to retrieve a maximum and a minimum value from a data set.

At block 220, a scale is established in view of the analysis of the data sets, and preferably in view of maximum and minimum values within the data set. A chart is rendered, as indicated at block 225, which uses the established scale of number of product/service sold and the established time interval (block 205). Data points are added to the chart, as indicated at block 230, preferably by plotting the data from the sales data table 430 at respective intersections of time and number-sold.

FIG. 5 shows a chart 510 that has been rendered in the user interface together with data from the weekly prescription data table 430. A graph is defined for each data set (e.g., each drug or other product), for example, by adding to the chart a line that interconnects the points or a curve that fits the point, etc., as indicated at block 235. The sales-data chart is thus generated through the operations of blocks 205 through 235 (and optionally block 270, discussed below).

The chart 510 differs from conventional sales charts in combining additional information from the territory management system, including site visit information relating to the dates on which the representative made visits to the prescriber (here, "Beth"). Symbols 550, such as the hexagons shown in FIG. 5, are appended to the chart and coordinate information from the call history of this representative with this particular prescriber. As noted above, site visits to HCPs and other customers result in the recording of call-notes, one call note for each visit. A history of call notes is available to the representative, see region 460, which indicates, among other things, the date of the visit and notes regarding what transpired during that meeting. The representative can have other historical information available in the customer summary page 400 such as a call frequency chart 470 which can summarize the number of visits to a given prescriber in the past month or quarter, or during the current calendar year, etc. However, of particular benefit to the representative is the coordination of site visit information which the representative has collected with sales data that has been collected by the third-party vendor.

At block 250, a database query retrieves call dates within the call history 460 that fall within the established time interval (block 205). This database query can be concatenated with the query at block 210 in some database implementations. The call notes are for specific visits on specific dates, and the date of the visit is important for other purposes such as matching expenses in connection with the expense-reporting functionality of the territory management system. However, for purposes of the chart 510, the call dates retrieved from the database optionally can be processed so as to have a date range assigned to each specific call date, for presentation in alignment with the week in which the prescription-fill data has been collected. This is useful because some patients may not fill a prescription the same day as visiting an HCP, and an HCP may not see a patient requiring a given prescription for several days after a representative's visit.

In the chart 510, for example, the time interval includes a number of weeks starting in July and continuing until mid-September. Included among those weeks are prescription-fill data collected for the weeks of July 7, July 14, July 21, July 28, August 4, and August 11. Each of these weeks can be established as a date range, such that July 21 through July 27 8 is one date range and August 4 through August 10 is another date range. A site visit within a given date range can be assigned to that date range, as indicated at block 255. If this is done, then a particular site visit will be generally indicated on the chart 510 as having occurred within a date range. In the example of prescriber "Beth," site visits in the call history 460 were on July 21, August 10, and September 15. The July 21 visit corresponds to the date range July 21-July 27, the August 10 visit corresponds to the date range August 4-August 10, and the September 15 visit corresponds to the date range September 9-September 14.

At block 260, the date ranges or call dates are marked on the chart 510 so that this information is superimposed on a single chart with the sales data. Thus, a single chart 510 indicates site visits to "Beth" with symbols 550 as well as filled prescriptions that were written by "Beth." In FIG. 5, the date ranges are shown and they have been aligned with the beginning of their respective date ranges. Alternatively, the symbol 550 can be centered within its corresponding date range or aligned in a different way, or the symbol 550 can be presented at a location that corresponds to the actual date of the site visit, if desired.

In the event that the data sets being charted include more than one product, a legend is created, as indicated at block 270. The legend (see FIG. 5) identifies colors or symbols assigned to each data set, and this can be done by a native function of the user-interface environment.

The symbols 550 preferably are interactive graphic objects which are configured to respond to user interaction. A preferred interaction is hovering a pointer device in the vicinity of the symbol 550, for example, over the object. An on-mouse-over event or similar event handling routine can respond to this event by presenting additional information from the local database.

At block 275, a test is made to determine whether the user is interacting with a symbol 550. This test, as noted above, can be event-driven and is shown as it is shown in the flow diagram for purposes of discussion. In the event that the test is positive, the database is accessed to retrieve additional information, as indicated at block 280. When the user interface is provided through a Web browser, as is presently preferred, The database access call can be performed using an Asynchronous JAVAScript and XML command (AJAX), which allows further data to be retrieved from the local database and displayed in the current page without reloading the entire page, and without requiring a connection to the central computer. For example, the additional information can be the actual date of the site visit, if not already shown, a number showing the average number of prescriptions filled that week by other HCPs in the representative's territory, or any other information concerning the prescriber, the territory, or the overall sales in the relevant market (assuming that data is available). The further details can be established and stored in a user-configuration file, which can differ depending on the preferences of a representative or on the basis of the person's role in the territory management system (representative can have a different configuration setting in this regard than a manager).

At block 285, the retrieved information is displayed adjacent the symbol 550. In FIG. 5, that further information is the actual call date and the number of visits to the HCP or other customer during that week. When the event that caused the data interrogation ends, for example, the pointer has been moved away or clicked elsewhere, the chart is displayed and the interface awaits any other event, including inspection of any other symbol 550, as indicated by the loop-back arrow.

The representative may decide to change the interval for data display, as tested at block 290. This test, just like the others, can be event-driven (e.g., a result of selecting the charts tab 420) and is shown as it is shown in the flow diagram for purposes of discussion. If the representative wishes to change the time interval, the process 200 loops back to step 205 and another chart is generated, and site visit information is coordinated with that chart, as described above. On the other hand, the user may take some other action, which the interface awaits and responds as appropriate.

Briefly, in addition to downloading sales information to the representative's machine (block 120), the sales information can be forwarded to a manager's machine. For example, the information can be forwarded (e.g., downloaded or communicated in other ways) to a district manager whose responsibility is to supervise and review the work of one or more representatives in one or more territories. In this regard, the manager can view sales details in one or more reports and take steps in furtherance of the analysis of such data such as by exporting the information to a spreadsheet, before continuing with whatever other tasks the manager may wish to do.

A person reviewing the chart 510 is provided with a coordinated reference that joins distinct information into a common, interactive presentation. Upon review of the sales trends, and possibly with reference to call notes, a representative can assess whether a message he or she delivered had impact on a given HCP/customer (e.g., as manifested as an uptick in sales after the site visit), or whether the message requires reinforcement (e.g., as manifested as a downtick in sales after a site visit), or whether frequency of visits might make an impact (e.g., an uptick or flat sales followed by a downtick). The representative or district manager has discretion to interpret the chart in a variety of ways, and can do so more effectively once the site visit information is coordinated with sales data. Further, the interactive presentation of the site visit symbol 550 provides a rapid tool to investigate details concerning that site visit, and configurations can be established to provide managers with details that span multiple representatives in the course of assessing message delivery.

With respect to the data shown in FIG. 5, for example, the information can be interpreted so as to suggest action to be taken by the representative. If the representative were to review the chart in and around September 9, he or she might conclude that a further visit to that prescriber might help address any concerns regarding the representative's products, since prescriptions are showing a decreasing trend in that time frame, yet had increased after the August 10 visit. Thus, a reinforcement message could be concluded more readily through the coordinated presentation of sales data and site visit information. On the other hand, the downtick in sales after the July 21 visit might initially be attributed, at least in part, to a lag between prescription filling and the site visit, but the subsequent reinforcement on August 10 and concomitant increase in sales with that prescriber could indicate, perhaps, that the prescriber responds well to repeated visits in short intervals. That conclusion, for example, might suggest a further visit is appropriate a few weeks after the September 15 visit.

The site visits described in connection with block 105 are preferably of the conventional type in which the representative makes a sales call which results in the recording of call notes at block 110. However, it may be that coordination of sales data with other events can be desirable in certain circumstances, including events in which there is no actual site visit to a customer's facility. One such event is the date of a meeting had by a company representative with the customer/prescriber, such as may occur at a conference or some other location which is not the customer's place of business. Another such event can be a link ("visit") made by the customer/prescriber to a Website of the manufacturer or service provider that the representative represents. In the case of a Website visit, if the customer logs onto the Website or is otherwise identifiable (e.g., through the transmission of cookies), the date of that event can be recorded for coordination with sales data. Yet another point of contact can be a data request made by the customer using a suitable electronic device through interrogation with a smart medium such as a smart poster or advertisement, as may be enabled using radio-frequency identification (RFID) or near-field communications (NFC) technologies. The Near Field Communications Forum, for example, provides protocols and structures suitable for implementing system that respond to such data requests. These events can define points-of-contact between the customer and the representative, his or her company, or his or her company's materials to supplement or be used instead of site visits. However, the private, personal interaction between a customer and a representative at a site visit to the customer's facility can provide a more meaningful interaction event for an analysis, once coordinated with sales data. For that reason, site visits are a presently preferred data point for coordination with sales data.

In the foregoing description, certain flow diagrams have been shown and processes described in relation to those flow diagrams which provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

We claim:

1. A machine-implemented method for providing a visualization of effectiveness of message delivery to a customer by a representative wherein the customer is an intermediary between the representative and a purchaser, comprising the steps of:
  recording, by a representative, a date of a site visit with the customer into a local database of a machine having a processor, the representative delivering the message to the customer, wherein the date of the site visit is received from the representative using a remote computing device;
  downloading, to the machine, sales data from a third-party different than the representative and the customer concerning consumption of a product or service in a region by the purchaser which is attributable to the customer and a sales territory of the representative, wherein the purchaser is a different person than the customer to whom the representative delivered the message and the sales data includes consumption of the product or service in the region by the purchaser on a date after the date of the site visit by the representative with the customer, and wherein the downloaded sales data includes a first portion of sales data and a second portion of sales data;
  analyzing, using the processor of the machine, the first portion of the sales data to identify a range of values associated with the first portion of the sales data;
  analyzing, using the processor of the machine, site visit information associated with the date of the site visit to identify a time interval;
  receiving, by the remote computing device, the downloaded sales data and the time interval;
  presenting the first portion of the sales data to the representative on a page displayed at the remote computing device as a chart having one or more axes according to the identified range of values associated with the first portion and the time interval;
  superimposing, by the remote computing device, site visit information including the date of the site visit by the representative with the customer on the chart for coordinated presentation with the chart of the first portion of downloaded sales data of the purchaser to the representative at the remote computing device;
  storing, using the processor of the machine, the second portion of the sales data at the local database;
  monitoring, by the remote computing device, for interaction with the superimposed site visit information; and
  in response to interaction with the superimposed site visit information received from the remote client device:
    presenting, at the remote computing device without further human interaction, the second portion of sales data from at least the local database based on the received interaction, wherein the remote computing device presents the second portion of sales data without reloading the page displayed at the remote computing device and without requiring a connection between the machine and the remote computing device.

2. The method of claim 1, including the additional step of establishing configuration settings which define the additional information presented from at least the local database, wherein the additional information includes sales data selected according to the received interaction.

3. The method of claim 1, wherein the interaction with the superimposed site visit information comprises use of a pointer device in the vicinity of the site visit information.

4. The method of claim 3, wherein the use of the pointer device comprises hovering the pointer device over the site visit information.

5. The method of claim 1, wherein the additional information is the site visit date.

6. The method of claim 1, wherein the downloading step includes:
  parsing the sales data to identify sales data associated with one or more customers assigned to the representative; and
  transmitting the parsed sales data to the representative.

7. The method of claim 1, wherein the step of generating the chart of acquired sales data includes the steps of rendering the chart over a time interval and having a scale established in view of the uploaded sales data.

8. The method of claim 1, wherein the downloading step comprises downloading an identified portion of the sales data that concerns the representative.

9. The method of claim 1, wherein the downloading step selectively downloads only that portion of the data which is relevant to one or more of the customers within a representative's sales territory.

10. A machine-implemented method for providing a visualization of effectiveness of message delivery to a customer by a representative wherein the customer is an intermediary between the representative and a purchaser, comprising the steps of:
  recording, by the representative, a date of a site visit with the customer into a local database of a machine having a processor, the representative delivering the message to the customer, wherein the date of the site visit is received from the representative using a remote computing device;
  acquiring sales data from a third party source different than the representative and the customer concerning consumption of a product or service in a region by the purchaser which is attributable to the customer and a sales territory of the representative, wherein the purchaser is a different person than the customer to whom the representative delivered the message and the sales data includes consumption of the product or service in the region by the purchaser on a date after the date of the site visit by the representative with the customer;
  downloading to the machine the acquired sales data from a third-party different than the representative, the downloaded sales data including a first portion of sales data and a second portion of sales data;
  analyzing, using the processor of the machine, the first portion of the sales data to identify a range of values associated with the first portion of the sales data;
  analyzing, using the processor of the machine, site visit information associated with the date of the site visit to identify a time interval;
  receiving, by the remote computing device, the downloaded sales data and the time interval;
  presenting the first portion of the sales data to the representative on a page displayed at the remote computing device as a chart having one or more axes according to the identified range of values associated with the first portion and the time interval;
  superimposing, by the remote computing device, site visit information including the date of the site visit by the representative with the customer on the chart for coordinated presentation with the chart of the first portion of downloaded sales data of the purchaser to the representative at the remote computing device;

monitoring, by the remote computing device, for interaction with the superimposed site visit information; and in response to interaction with the superimposed site visit information received from the remote computing device:

presenting, at the remote computing device without further human interaction, the second portion of sales data from at least the local database based on the received interaction, wherein the remote computing device presents the second portion of sales data without reloading the page displayed at the remote computing device and without requiring a connection between the machine and the remote computing device.

11. The method of claim 10, wherein the sales data is acquired from a third-party vendor.

12. The method of claim 10, including the additional step of establishing configuration settings which define the additional information presented from at least the local database.

13. The method of claim 10, wherein the interaction with the superimposed site visit information comprises use of a pointer device in the vicinity of the site visit information.

14. The method of claim 13, wherein the use of the pointer device comprises hovering the pointer device over the site visit information.

15. The method of claim 10, wherein the additional information is the site visit date.

16. The method of claim 10, wherein the downloading step includes:

parsing the sales data to identify sales data associated with one or more customers assigned to the representative; and transmitting the parsed sales data to the representative.

17. The method of claim 11, wherein the step of generating the chart of acquired sales data includes the steps of rendering the chart over a time interval and having a scale established in view of the downloaded sales data.

18. The method of claim 10, wherein the downloading step comprises downloading an identified portion of the sales data that concerns the representative.

19. A machine-implemented method for providing a visualization of effectiveness of message delivery to a customer by a representative wherein the customer is an intermediary between a representative and a purchaser, comprising the steps of:

recording a date of a point-of-contact of the representative with the customer into a local database of a machine having a processor, the representative delivering the message to the customer, wherein the date of the site visit is received from the representative using a remote computing device;

downloading, to the machine, sales data from a third-party different than the representative and the customer concerning consumption of a product or service in a region by the purchaser which is attributable to the customer and a sales territory of the representative, wherein the purchaser is a different person than the customer to whom the representative delivered the message and the sales data includes consumption of the product or service in the region by the purchaser on a date after the date of the point-of-contact of the representative with the customer and wherein the downloaded sales data includes a first portion of sales data and a second portion of sales data;

analyzing, using the processor of the machine, the first portion of the sales data to identify a range of values associated with the first portion of the sales data;

analyzing, using the processor of the machine, site visit information associated with the date of the site visit to identify a time interval;

receiving, by the remote computing device, the downloaded sales data and the time interval;

presenting the first portion of the sales data to the representative on a page displayed at the remote computing device as a chart having one or more axes according to the identified range of values associated with the first portion and the time interval;

superimposing, by the remote computing device, the date of the point-of-contact of the representative with the customer on the chart for coordinated presentation with the chart of the first portion of downloaded data of the purchaser to the representative at the remote computing device;

storing, using the processor of the machine, the second portion of the sales data at the local database;

monitoring, by the remote computing device, for interaction with the superimposed site visit information; and in response to interaction with the superimposed point-of-contact information received from the remote computing device:

presenting, at the remote computing device without further interaction, the second portion of sales data from at least the local database based on the interaction, wherein the remote computing device presents the second portion of sales data without reloading the page displayed at the remote computing device and without requiring a connection between the machine and the remote computing device.

20. The method of claim 19, wherein the downloading step comprises downloading an identified portion of the data that concerns the representative.

* * * * *